May 5, 1970  T. HERMANN  3,510,140

SOCKET-TYPE JOINT GASKET CONSTRUCTION

Filed May 22, 1967  2 Sheets-Sheet 1

INVENTOR.
THEODOR HERMANN
BY
McGlew & Toren
ATTORNEYS.

May 5, 1970   T. HERMANN   3,510,140
SOCKET-TYPE JOINT GASKET CONSTRUCTION
Filed May 22, 1967   2 Sheets-Sheet 2

INVENTOR.
THEODOR HERMANN
BY
*McGlew & Toren*
ATTORNEYS

United States Patent Office 3,510,140
Patented May 5, 1970

3,510,140
SOCKET-TYPE JOINT GASKET CONSTRUCTION
Theodor Hermann, Gelsenkirchen, Germany, assignor to
Rheinstahl Huttenwerke AG, Essen, Germany
Filed May 22, 1967, Ser. No. 640,100
Claims priority, application Germany, June 3, 1966,
R 43,401
Int. Cl. F16j 15/10, 15/00
U.S. Cl. 277—205
13 Claims

ABSTRACT OF THE DISCLOSURE

A gasket for use in forming a seal between a straight end of one pipe and a socket-shaped end of another pipe includes an underlying tubular portion which is adapted to tightly engage around the straight end of the first pipe and an overlying tubular portion formed as a continuation of the underlying tubular portion which is adapted to be rolled backwardly to overlie the underlying tubular portion when the pipe having the straight end is inserted into the socket-forming end of the other pipe.

---

A feature of the inventive construction is that the tubular gasket includes an intermediate annular projection of substantially trapezoidal shape which is formed on the interior wall and defines a substantially straight abutment wall on one end which abuts against the edge of the straight pipe and limits the amount of insertion of the tubular portion over the straight pipe end. A further feature of the invention is the provision of an enlarged bead or annular torus formation at the outer end of the gasket which is adapted to be positioned to overlie the portion of the gasket covering the straight end of the first pipe. During insertion of the straight pipe into the socket of the other pipe, the end of the socket-forming pipe engages behind the torus formation at the end of the gasket and causes the overlying portion of the gasket to be moved along the length of the underlying portion which is engaged around the straight end of the first pipe. The movement is completed when the enlarged torroidal-shaped end of the gasket is pushed over the end of the portion which is engaged on the straight pipe. The inner end of the portion which engages over the straight pipe is advantageously made so that its wall thickness increases toward this end in a conical fashion so that the torroidal-shaped portion of the overhanging part must be directed thereover. For this purpose, lubricant is advantageously placed on the exterior surface of the portion which is engaged over the straight end of the first pipe.

Another embodiment of the gasket includes a bead formation or enlargement of the gasket at a location on the portion of the gasket engaged around the straight end of the first pipe directly adjacent this end so that the enlarged torroidal formation at the end of the overhanging portion of the gasket will engage behind the bead and will be retained thereby in this position until the pipe with the socket formation is engaged therebehind for complete insertion of the straight pipe into the socket portion. In this manner there will be no danger that the overhanging end will peel off the underlying layer and extend straight outwardly from the straight end of the first pipe.

A still further embodiment includes a formation of a plurality of grooves on the interior surface of the portion of the gasket which engages over the pipe having the straight end. The grooves define recesses which permit some compression of the gasket in this area in order to facilitate the movement of the torroidal end portion of the overhanging gasket part over the exterior surface of the part that engages on the straight pipe during insertion of the straight pipe into the socket.

SUMMARY OF THE INVENTION

This invention relates in general to pipe sealing devices and in particular to a new and useful gasket construction which is adapted to be engaged over the end of a straight pipe and to seal the space between the straight pipe and a socket portion defined on another pipe.

It is known to seal socket pipes by rubber gaskets which are arranged in the sealing gap between the socket formation of one pipe and the straight end portion of another pipe and in which the pipes are sealed together under a biasing stress. Rubber gaskets used for such purpose have the necessary elastic properties, but other similar materials may be employed by providing cavities or other extensions to impart elasticity in such areas. A special type of such gasket is a so-called rolling rubber gasket which includes a tubular portion which is stretched over the end of the straight pipe and an overlying portion which is rolled back over the tubular portion upon interengagement of the straight portion in a socket of another pipe. To form the sealing point, the first tubular part is slightly stretched over the end of the straight pipe and the overhang part normally extends outwardly therefrom and then is rolled back upon itself and over the tubular portion which is engaged over the straight end of the first pipe. It is known to provide such devices with additional sealing lips and to provide means for retaining the tubular engaging portion at a predetermined location in respect to the straight end pipe during the rolling interengagement of the gasket between the two pipes when the joint is formed. Simple rolling rubber gaskets are satisfactory for such sealing joints when the pipe tolerances remain within ordinary limits, but a disadvantage in the known gasket constructions is that they are not easily formed into a tight sealing joint by the rolling action or the interengagement of the straight pipe and socket pipe requires considerable effort. In addition, gaskets of this type require additional filling of the sealing gap after they are inserted, and this must be done from the outside. This sealing is necessary in order to increase the rigidity of the joint and to obtain an outer seal against the penetration of dirt, microorganisms, etc.

In accordance with the present invention there is provided a gasket which is of the rolling type and which includes a first end portion which is fitted around one pipe to be formed in a joint adjacent a straight end thereof and which also includes an overhanging or rolling portion which is adapted to be rolled back upon itself and over the first portion. With the inventive construction the placement of the first portion on the end of the straight pipe is limited by a substantially trapezoidal projection which abuts with its straight portion against the straight edge of the straight pipe. In addition the rolling movement of the overlying gasket part in respect to the underlying part is facilitated and the sealing characteristics are increased by the formation of a widened bead or torus at the end of the overhang portion which is engaged by the end of the socket of the second pipe to be joined. The bead with the remainder of the overlying portion is urged backwardly over the first portion and engaged over the edge thereof and between the end of the socket pipe and the wall of the straight pipe in the final sealing position. A joint of this nature insures a good seal and an outer termination of the sealing gap even with greater pipe tolerances. The gasket requires relatively little insertion force and imparts to the pipe joint a greater transverse rigidity.

The gasket of the invention advantageously is formed with a first portion which widens in a direction away from the end of the straight pipe around which it tightly engages to enhance the sealing effect produced by the rolling over of the overhang portion. This design also enhances the transverse rigidity of the joint in addition to the sealing properties. The interior trapezoidal projection formed intermediate the length of the tubular gasket is located so that it will be turned over and positioned on top of the first portion of the gasket which overlies the first pipe adjacent its straight end which is located at the inner end of the socket. In this manner, the gasket projects upwardly against the interior wall of the socket portion of the second pipe at the location where the thickness dimension of the first portion of the gasket is the least. The construction makes it possible to insert the two pipe members into sealing engagement without any undue force, and it also provides an additional sealing point at the inner end of the gasket after the sealing joint has been made.

Sealing of the joint is effected when the straight member is forced into the socket portion of the second pipe which causes the end of the socket member to engage behind the widened bead portion which is formed at the outer end of the overhang portion of the gasket. Before this is done, the overlying portion is moved backwardly upon the outer area of the first underlying portion. To facilitate further advance of the overlying portion along and over the surface of the underlying portion, the first portion is advantageously coated with a lubricant film to facilitate the sliding movement of the two portions. Insertion of the straight pipe into the socket is continued while the gasket is rolled back upon itself until the widened end portion or torus is pushed by the end of the socket of the second pipe over the widened inner end of the underlying portion of the gasket and engages behind the end adjacent the surface of the straight pipe.

In accordance with a further feature of the invention, means are formed on the underlying portion to hold the overlying portion in a position in which it is partially rolled backwardly on the first portion. Such means advantageously include a projecting formation defined on the first portion adjacent the end of the straight pipe which retains the widened portion or torus at a location at which insertion of the straight pipe into the socket portion of the second pipe may proceed. In accordance with a further embodiment, the underside of the first portion of the gasket is advantageously made with a plurality of grooves to permit resilient yielding of this portion in order to facilitate roll back and insertion.

In accordance with a still further embodiment, the gasket is advantageously made with a roll back or overlying portion which extends obliquely back upon a first portion which is adapted to engage around the straight end of a first pipe so that after the first portion is engaged around the pipe, the roll back portion will be in a position to complete the joint by inserting the straight pipe into the socket of the second pipe.

Accordingly it is an object of the invention to provide a sealing gasket for sealing pipe joints which includes a tubular gasket member with a first or underlying portion which is adapted to tightly engage around an end of a straight pipe and a second or overlying portion which is connected to the first portion and which is adapted to be rolled back upon the first portion upon insertion of the straight pipe into the socket of a second pipe, and wherein the interior of the gasket is provided with an inwardly extending projection defining a stop for limiting the inner position of the first portion in respect to the associated straight end of the first pipe, the extreme end of the second portion being provided with a widened bead portion or torus formation which is adapted to be pressed by the end of the socket-bearing pipe over the surface of the first portion and locked behind the end of the first portion when the two pipes are in sealing engagement.

A further object of the invention is to provide a tubular roll-on gasket having a first portion which is adapted to fit over a straight end of a first pipe which includes a wall which is thickened toward its inner end and which has means for holding a widened bead portion of a second portion in a position at which it may be engaged by the end of a socket-bearing pipe to move it along the surface of the first portion during interengagement of the two pipe sections.

A further object of the invention is to provide a tubular roll-on sealing gasket which is provided with a first end which is adapted to engage around the end of a straight pipe and a second end connected thereto, and wherein the first end includes a plurality of grooves defined on the inner surface thereof for facilitating the resilient movement thereof during the roll-on sealing engagement of the pipe into a socket of another pipe at which time the widened end of the second roll-on portion of the gasket is moved over the surface of the first portion.

A further object of the invention is to provide a sealing roll-on type tubular gasket which is simple in design, rugged in construction and economical to manufacture.

The various features of novelty which characterizes the invention are pointed out with particularity in the claims annexed to and forming a part of this specification. For a better understanding of the invention, its operating advantages and specific objects attained by its use, reference should be had to accompanying drawings and descriptive matter in which there are illustrated and described preferred embodiments of the invention.

DETAILED DESCRIPTION

Figure 1:
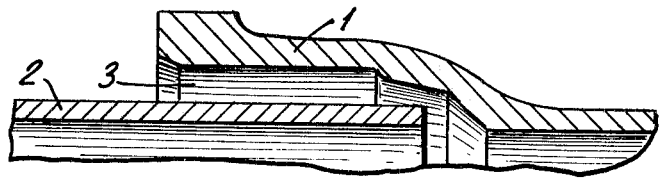
FIG. 1 is a partial axial sectional view of two pipe sections arranged in an interengaged position which they will assume when sealed with a gasket constructed in accordance with the invention.
Figure 2:
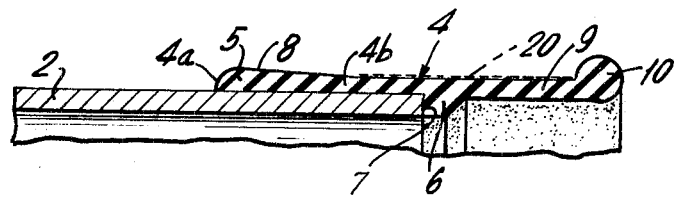
FIG. 2 is a partial axial sectional view of the first pipe with the sealing gasket applied thereto.

Referring to the drawings in particular, as indicated in FIG. 1 there is indicated a socket pipe 1 with a straight pipe 2 having its straight end engaged in the interior socket 3 of the socket pipe. The invention provides a sealing gasket for sealing the space between the pipe 2 and the socket pipe 1.

In accordance with the invention, a sealing gasket generally designated 4 comprises a tube which is made of a material such as flexible rubber of about 50 Shore hardness. The tube 4 includes a straight pipe engaging portion or underlying portion 5 which is applied under initial stress over the end of the straight pipe 2 and an overlying or projecting portion 9 which extends outwardly from the end 7 of the pipe 2. The gasket 4 includes an interior projection or lug 6 which is of substantially trapezoidal shape and includes a straight edge which abuts against the straight edge 7 of the tube 2 and thus limits the inner movement of the gasket 4 and controls the innermost position of the underlying portion 5. The lug 6 thus constitutes a stop which is arranged substantially centrally between the ends of the gasket 4. The thickness of the lug 6 is advantageously made to correspond to the thickness of the pipe 2.

In accordance with a feature of the invention the top surface 8 of the underlying portion 5 extends obliquely upwardly proceeding from the end of the pipe 2 inwardly so as to form a conically outwardly tapered portion adjacent the inner end 4a.

Figure 3:
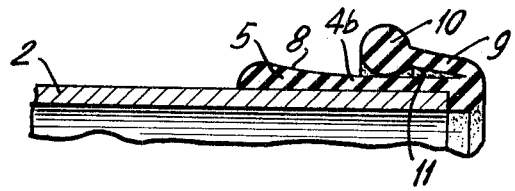
FIG. 3 is a view similar to FIG. 2 showing the gasket in an initial roll-on position prior to insertion of the straight pipe into the socket bearing pipe.
Figure 4:
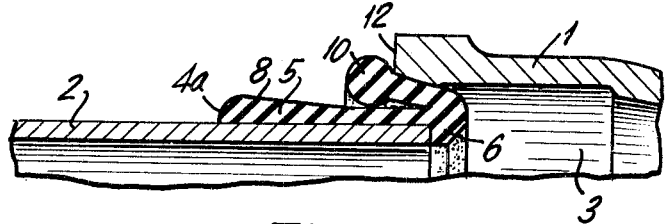
FIG. 4 is a view similar to FIG. 3 but indicating the initial position of the socket bearing pipe during insertion of the straight pipe and sealing gasket thereinto.

The overhanging portion 9, in accordance with another feature of the invention, is provided with a widened bead or torus formation 10. The torus 10 is initially positioned as indicated in FIG. 3 in a partially rolled up condition of the gasket 4 so as to overlie a substantially straight wall portion 4b of minimal thickness of the underlying part 5. While the bead 10 is shown as being toroidal in shape and projecting from the outer or top side, it may also project from the inner side or be of an oval or angular configuration. The thickness of the gasket at both sides of the lug 6 arranged together in overlapping relationship as indicated in FIGS. 3 and 4 is less than the inside width of the annular gap between the exterior of the pipe 2 and the interior of the socket pipe 1 so that the tube 2 fits easily into the tube 1 with the gasket thereon in a partially rolled up condition. Before turning the gasket 4 to a rolled up condition, the top surface is covered with a lubricant 20, as indicated thereon in dotted lines. This lubricant will be retained in a pocket 11 after the initial roll over, as indicated in FIG. 3.

In FIG. 4, the pipe 2 is introduced into the socket 3 to cause contact of the end 12 of the pipe 1 with the bead 10. During further insertion, the bead 10 and the overlying part 9 slide on the lubricant film toward the conical part 8 and over the conical part until it bears behind the rounded end 4a. During this insertion the lug 6 is turned around and bears upwardly from the exterior of the gasket 4 on the inside wall of this socket pipe 1.

Figure 5:
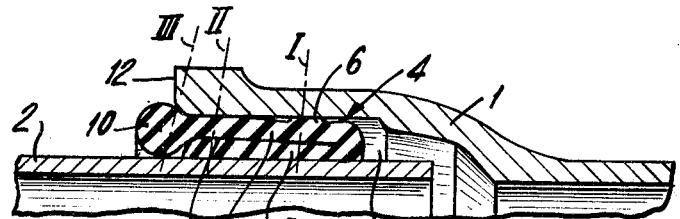
FIG. 5 is a view similar to FIG. 1 but with the sealing gasket disposed between the two pipes.

In the end position of the pipes 1 and 2 and the gasket 4, as indicated in FIG. 5, the joint is characterized by the following details:

(a) At the location of the section line I there is an inner sealing which is produced by the turned over and flexibly deformed lug 6 acting on the inside of the socket pipe 1.

(b) At the location of the section line II there is a tight wedge-shaped bearing and sealing engagement between the conical part 8 of the underlying part 5 and the overlying part 9. This wedge-like sealing construction provides not only a good seal but also imparts a good transverse rigidity to the joint.

(c) At the location of the section line III there is provided an outer seal produced by the bead 10 bearing behind the rounded end 4a on the exterior of the pipe 2 and against the front edge 12 of the pipe 1.

Figure 6:
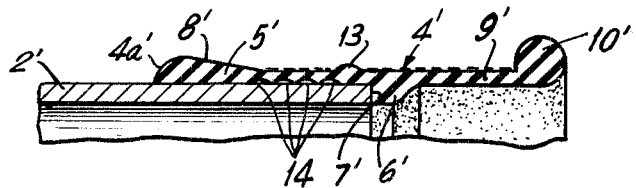
FIG. 6 is a view similar to FIG. 2 of another embodiment of the invention.
Figure 7:
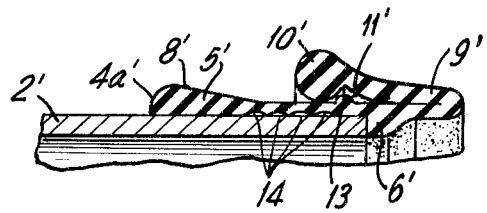
FIG. 7 is a view similar to FIG. 3 of the embodiment of the invention indicated in FIG. 6.
Figure 8:
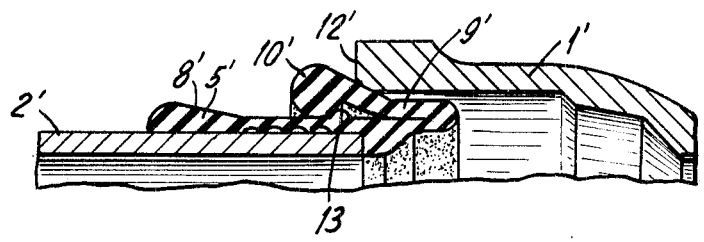
FIG. 8 is a view similar to FIG. 4 of the embodiment of the invention indicated in FIG. 6.

In the embodiment illustrated in FIGS. 6 to 8, there is provided a gasket 4' which is shown in association with a straight pipe 2' and a socket pipe 1'. The gasket 4' consists of parts which are similar to the other embodiment and which are similarly designated but with a prime. In this embodiment, however, there is provided an annular projection or holding nose 13 having a rounded exterior surface over which the bead 10' is directed in the initially folded over or rolled up state as indicated in FIG. 7. In addition, the bottom surface of the underlying part 5' is provided with a plurality of annular grooves 14 which provides a compensation for the increased thickness of the underlying part 5' produced by the annular projection 13 so that there will be no marked increase of the insertion force required for installing the gasket. Thus, the projection 13 insures that the overhanging part 9' will remain in a turned-over position indicated in FIG. 7 and will not return to the out-stretched position of FIG. 6 prior to the insertion of the tube 2' into the socket tube 1'. Thus, with this construction there will be no likelihood that the overhanging portion 9' will unroll and there will be no marked increase in the insertion force required.

Figure 9:
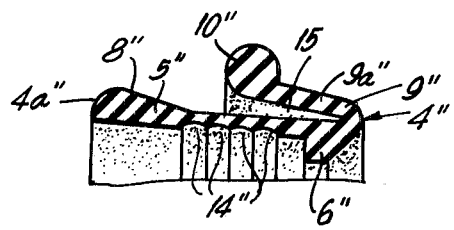
FIG. 9 is a partial sectional view of another embodiment of gasket.

In the embodiment indicated in FIG. 9, the gasket 4" is provided which includes an overlying portion 9" which is manufactured or formed initially in a partly turned-over condition in which an initially rolled over portion 9a" forms an angle with the underlying portion 5" and defines a wedge-shaped pocket 15 for receiving lubricant. In this embodiment grooves 14 are provided on the inner circumference of the underlying portion 5" to improve the flexibility of the gasket in order to facilitate complete roll over upon installation of the gasket with the pipes to form a joint.

What is claimed is:

1. A roll-back gasket sealing a space between a substantially straight pipe and a pipe having a socket formation into which the straight pipe is fitted, comprising a tubular body of a resilient material having an underlying tubular portion fitting tightly around the end of the straight pipe and terminating at an inner end and an overlying tubular portion connected to the underlying portion and forming an in-line tubular extension thereof which is folded back upon the underlying portion when positioned between the straight pipe and the interior wall of the socket formation, a lug on said overlying tubular portion projecting inwardly from the interior of said overlying tubular portion at a location intermediate the length thereof defining a stop surface adapted to bear against the edge of the straight pipe for limiting the inner movement of the gasket onto the straight pipe, said overlying portion having a thickened bead formation forming a first extension compressible seal at the end of said gasket opposite to and extending beyond said inner end, said overlying portion, including said lug and said widened bead formation positioned over said underlying portion and with said lug extending outwardly from the exterior of said tubular body and defining a second exterior compressible seal engageable against the inner wall of said socket formation in a sealed rolled back condition, said underlying portion having a wedge shaped end compressed against said overlying portion adjacent said thickened bead formation.

2. A gasket according to claim 1, wherein said underlying portion is made of an interior dimension which is slightly smaller than the dimension of the straight pipe over which it is to be attached.

3. A gasket according to claim 1, wherein said underlying portion widens toward its inner end.

4. A gasket according to claim 1, wherein said inner end is rounded.

5. A gasket according to claim 1, wherein the combined thickness of said underlying portion and said overlying portion of said gasket on each side of said lug is at least not greater than the minimum width of the gap between the exterior wall of the straight pipe and the interior wall of the pipe having the socket formation.

6. A gasket according to claim 1, wherein said gasket includes means for holding said overlying portion in a position in which at least a portion thereof is disposed over said underlying portion.

7. A gasket according to claim 1, wherein said underlying portion includes an annular projection spaced slightly inwardly from said lug formation but on the exterior wall of said gasket for engaging behind the widened bead formation of said overlying portion to hold said overlying portion in a partly rolled back position.

8. A gasket according to claim 1, including a plurality of annular grooves defined on the interior of said gasket on the area of said underlying portion.

9. A gasket according to claim 8, wherein said underlying portion includes a thickened area adjacent its end and a projection adjacent its opposite end over which the widened bead portion of said overlying end is positioned prior to insertion of said straight pipe into said socket, said grooves being defined in the area between said widened portion and said projection.

10. A gasket according to claim 8, wherein said grooves are formed one alongside the other and include sharp adjoining edges therebetween.

11. A gasket according to claim 1, wherein said overlying portion from said interior lug formation to said widened bead formation extends backwardly over said underlying portion and at an acute angle in respect thereto, the material of said gasket being such to maintain said overlying portion at an acute angle in respect to said underlying portion until the straight pipe is inserted into the socket pipe.

12. A pipe joint comprising a first pipe having a socket formation at its one end, a second pipe having a substantially straight end inserted into said socket portion and leaving an annular gap between said first pipe and said second pipe, and a roll back gasket disposed in the gap between said first pipe and said second pipe made of a resilient material and including an underlying tubular portion stretched around and engaging said second pipe and an overlying tubular portion bent backwardly over said underlying portion and including a projection compressed into tight engagement with said first pipe and providing a first tight seal adjacent the inner end of said socket of said first pipe when said overlying tubular portion is in a bent-back position, said overlying tubular portion being formed as a straight continuation of said underlying portion so that said projection extends inwardly before said overlying portion is bent backwardly over said underlying portion and defines a stop which projects inwardly and engages against the straight end of said second pipe and limits the amount at which said second pipe extends into said gasket, said underlying portion having a widened wall so that it and the overlying portion define a second seal intermediate the length of said gasket and adjacent the outer end of said first pipe, said overlying portion including a widened bead portion at its end engaged around the end of said underlying portion and against the end of said first pipe and against the wall of said second pipe and defining an outer seal between said first and second pipes.

13. A pipe joint according to claim 12 including an annular exterior projection engaged behind said widened bead portion.

References Cited

UNITED STATES PATENTS 3,334,928  8/1967  Schmunk _____ 277—208 X

FOREIGN PATENTS 1,111,258  7/1961  Germany.
1,136,167  9/1962  Germany.
  185,874  1/1965  Germany.
1,187,434  2/1965  Germany.

LAVERNE D. GEIGER, Primary Examiner

J. S. MEDNICK, Assistant Examiner

U.S. Cl. X.R.

277—207, 225; 285—231, 344